United States Patent [19]

Nguyen

[11] Patent Number: 4,967,988
[45] Date of Patent: Nov. 6, 1990

[54] DASH MOUNTED TISSUE BOX HOLDER

[76] Inventor: Thanh T. Nguyen, 8102 Amelia #511-K, Houston, Tex. 77055

[21] Appl. No.: 312,818

[22] Filed: Feb. 21, 1989

[51] Int. Cl.[5] .............................................. B60R 7/00
[52] U.S. Cl. ..................................... 248/150; 248/905; 224/277
[58] Field of Search ............... 248/146, 150, 152, 176, 248/205.3, 310, 311.2, 314, 346, DIG. 5, 519, 523, 528, 529; 206/494, 812, 557; 220/410, 408, 400, 6; 108/27, 45, 55.1; 224/277, 42.34

[56] References Cited

U.S. PATENT DOCUMENTS

| | | | |
|---|---|---|---|
| 156,470 | 11/1874 | Warner | 220/6 |
| 1,588,271 | 6/1926 | Saint | 206/557 |
| 2,221,504 | 11/1940 | Beasley | 220/6 |
| 2,704,974 | 3/1955 | Setman | 206/557 |
| 2,931,489 | 4/1960 | Farnholtz | 224/277 |
| 3,288,416 | 11/1966 | Franklin | 248/DIG. 5 |
| 3,297,289 | 1/1967 | La Raus | 248/346 |
| 3,324,524 | 6/1967 | Perron | 248/346 |
| 3,414,156 | 12/1968 | Felldin | 220/6 |
| 3,913,810 | 10/1975 | Shaw | 248/DIG. 5 |
| 4,781,300 | 11/1988 | Long | 220/6 |

FOREIGN PATENT DOCUMENTS

| | | | |
|---|---|---|---|
| 133855 | 10/1919 | United Kingdom | 248/346 |
| 431079 | 7/1935 | United Kingdom | 248/346 |

Primary Examiner—Ramon O. Ramirez
Assistant Examiner—Robert Olson
Attorney, Agent, or Firm—Richard L. Moseley

[57] ABSTRACT

A tissue box holder is provided for mounting on a surface such as an automobile dash board. The tissue box has walls that are collapsible inward when not in use.

1 Claim, 2 Drawing Sheets

DASH MOUNTED TISSUE BOX HOLDER

BACKGROUND OF THE INVENTION

Tissue box cases and holders are old and common in the art. Chiefly they are meant to be more decorative than functional. However some may be fitted with attachment means for mounting to a surface. Most such containers are simply "boxes" without a bottom which are substantially the same dimensions as a "standard" facial tissue box. Applicant is aware that facial tissues are now sold in a variety of boxes and shapes. The most common, however, are either the "tall" boxes having dimensions of approximately 4 and ½ inches square by 5 inches tall, or the "flat rectangular" boxes 4½ inches wide by about 10 inches long and varying in height.

Most of the holders which are available are simply covers with no bottoms. These would not be particularly adaptable to mounting on a surface such as the dash of an automobile or truck. Holders having bottoms present the problem of how to insert the facial tissue box into the holder. A simple solution would be to invert the holder leaving it open at the top. However, when not in use or empty, they may be considered unsightly by some.

The inventor herein has devised a mountable holder that is lightweight and that is practically out of view when not in use.

SUMMARY OF THE INVENTION

The invention comprises an open top holder with walls which may be collapsed inward when not in use. The walls or sides are of sufficient height to retain the facial tissue box in place, and the ends of each wall are formed into angles of 45° or less from the vertical. The walls may thus be folded inward with out interference with one another. Additionally, the hinging mechanism prevents the walls from being folded outward past the vertical. The bottom of the base of the holder is provided with an adhesive to allow mounting on a surface.

DESCRIPTION OF THE PREFERRED EMBODIMENT

For a detailed description of the preferred embodiment the reader is directed to the accompanying figures in which like components are given like numerals for ease of reference.

Figure 1:
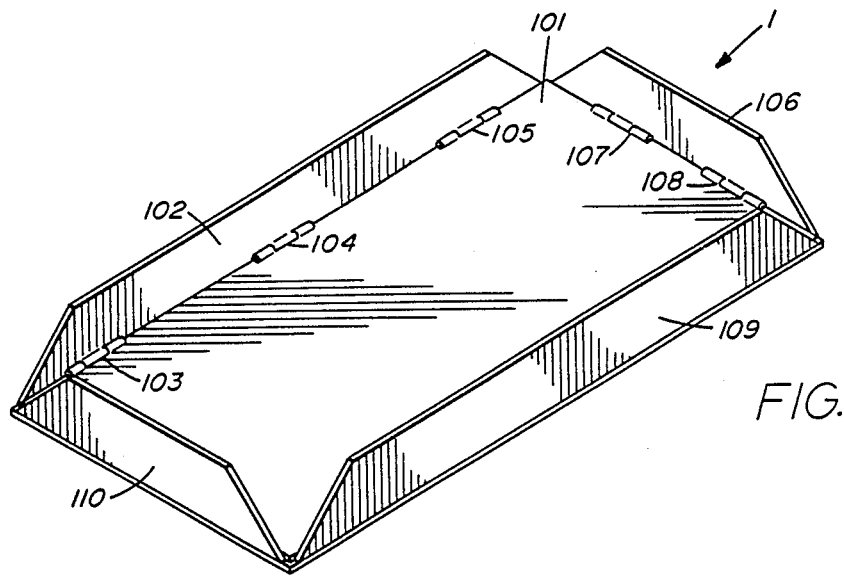
FIG. 1 is a top perspective view of a preferred of the invention.
Figure 4:
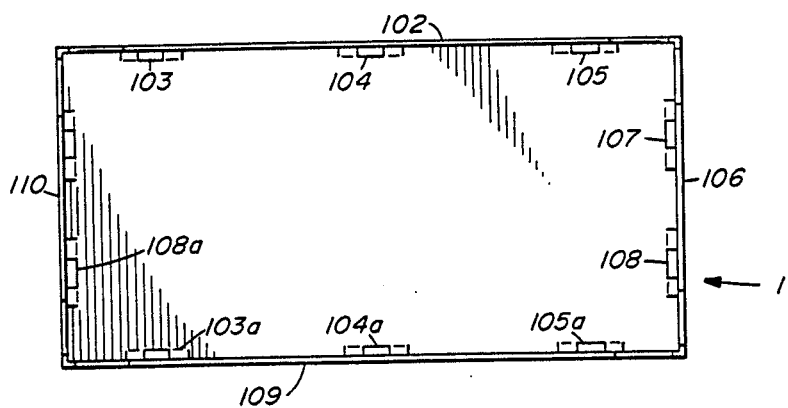
FIG. 4 is a top view of the embodiment shown in FIG. 1.

In FIG. 1 there is illustrated an overall view of the preferred embodiment of the invention. The invention, generally indicated at 1, is shown to include a base 101 with sides 102 and 109 and ends 106 and 110. In the view shown side 102 is connected to base 101 by hinges 104 and 105. End 106 is shown connected to base 101 by hinges 107 and 108. In FIG. 4 all of the connecting hinges are shown from above. Side 109 is shown connected to base 101 by hinges 103a and 104a while end 110 is shown connected to base 101 by hinges 107a and 108a. The hinges used in the prototype were simple hollow cylindrical beads glued to the walls and base. A pin was inserted to connect the beads into a single hinge member. Other arrangements would be just as satisfactory such as integrally molded ball and clasp type hinges.

Figure 2:
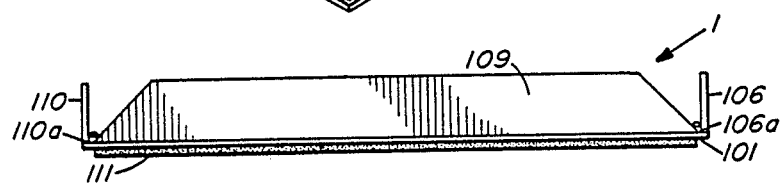
FIG. 2 is a side elevational view of the embodiment shown in FIG. 1.
Figure 5:
FIG. 5 is an end elevational view of the embodiment shown in FIG. 1.

Referring now to FIGS. 2 and 5, a side elevational view of a side and end are shown. Particular notice should be given to the ends of the side and end members. Each of these members is formed at an angle of 45° or less to the vertical, so that they may be folded inwardly to lie flat against the upper surface of base 101. The hinges are arranged such that when in the vertical position the bottom edges of the members 106a and 110a rest squarely on the upper surface of the base 101. This prevents further folding outward and keeps the wall members (sides and ends) in the vertical position. A layer of adhesive 111 is shown attached to the bottom surface of the base for mounting the holder 1 to a relatively flat surface, such as an automobile dash board.

Figure 3:
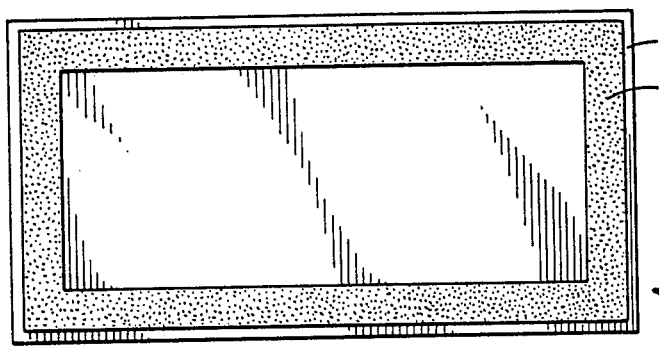
FIG. 3 is a bottom view of the embodiment shown in FIG. 1.

FIG. 3 illustrates a preferred arrangement of the adhesive on the bottom of the base 101. A strip of the adhesive is secured to the bottom surface of the base all the way around and near the outer circumference of the base. Any amount and placement the would be effective would suffice.

Figure 6:
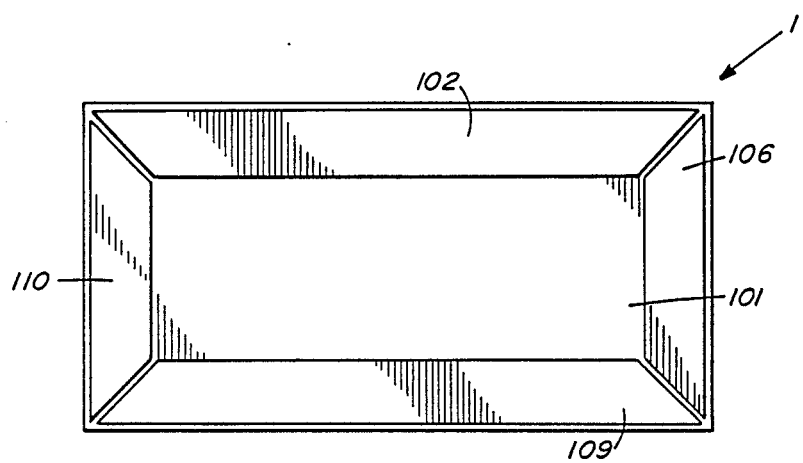
FIG. 6 is a top view of the embodiment shown in FIG. 1 with the walls folded inward.

FIG. 6 illustrates the sides 102 and 109 and ends 106 and 110 folded inward against the top surface of the base 101. The arrangement of the hinges connecting the sides and ends to the base is such that the hinges are concealed.

The foregoing description of the invention has been directed to a particular preferred embodiment of the present invention for purposes of explanation and illustration. It will be apparent to those skilled in the art that many modifications and changes in the apparatus may be made without departing from the scope and spirit of the invention. It is, therefore, intended that the following claims cover all equivalent modifications and variations as fall within the scope of the invention as defined by the claims.

What is claimed is:

1. A tissue box holder suitable for mounting on a surface, comprising:

a rectangular base having side and end edges and top and bottom surfaces;

side members hingedly attached to each of said side edges of said base, each end of said side members being formed at an angle of 45° or more from the vertical;

end members hingedly attached to each of said end edges of said base, each end of said end members being formed at an angle of 45° or more from the vertical;

said side and end members being hingedly attached to said base such that said members may be folded inwardly to lie flat against said top surface while preventing said members from being folded outward past the vertical; and adhesive material secured to said bottom surface for attaching said tissue holder to a surface.

* * * * *